F. H. ISAACS.
Sulky-Plow.
No. 208,978.
Patented Oct. 15, 1878.
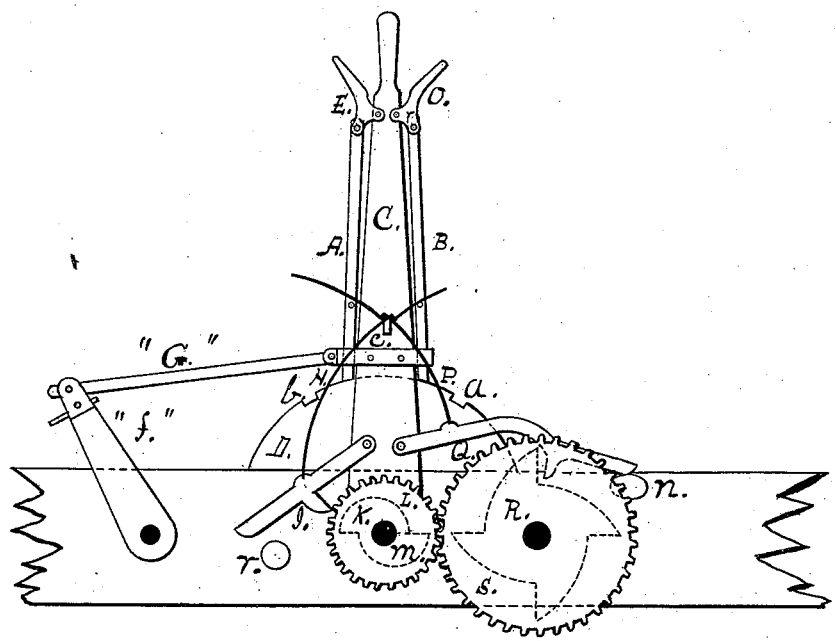
Witness
Wm. H. Isaacs.
Isaac Tuttle.
Inventor
Fred'c H. Isaacs
By Horace Harris
Att'y

UNITED STATES PATENT OFFICE.

FREDERIC H. ISAACS, OF NEWARK, NEW JERSEY.

IMPROVEMENT IN SULKY-PLOWS.

Specification forming part of Letters Patent No. 208,978, dated October 15, 1878; application filed September 7, 1877.

*To all whom it may concern:*

Be it known that I, FREDC. H. ISAACS, of Newark, in the county of Essex and State of New Jersey, have invented a new and useful Improvement in Sulky-Plows, which improvement is fully set forth in the following specification and accompanying drawing, which shows a sectional elevation from the same point as Figure 2 of my former patent for sulky-plows, No. 172,025, granted January 11, 1876.

The drawing represents only so much of the machine as relates to my present improvement.

The object of my invention is to improve on my former patent, so that the operation of putting the plows in the ground or of lifting them out and up shall be automatic, being wholly performed by the power that drives the plows, the operator having only to attend to the raising of the two cut-offs within his reach. These cut-offs A and B are hung one to each side of the lever C, and are made to drop into notches $a$ and $b$ in the semicircle D. This lever connects with the plows by means of the connecting-rods G and cranks $f$, the same as in my former patent.

When it is desirable to put the plows in the ground, the operator, by the arm E, raises the cut-off A, if the plows have been at a carrying position, and the connecting-spring P is lifted from the support $c$, and the pawl Q dropping down and engaging the ratchet R in the side of the wheel $s$, which gets its motion from being geared to the wheel L, and the motion of the wheel S, as the machine is drawn along, will throw the lever $c$ backward until the cut-off B drops into the notch $a$, when the arm of the pawl Q will slide upon the lug $n$, which will release this pawl from the ratchet; or, adopting its equivalent, the same thing can be accomplished by thickening the tooth of the hind ratchet, so that it would work on the principle of a cam, and thus dispense with the hind lugs, and the spring P will again catch on the support $c$, and the plows, being thrown into the ground by the backward motion of the lever, will continue in position for use, being locked by the cut-off B.

To raise the plows out of the ground, the action is the same, but is on the cut-off B, for as soon as this is raised by means of the arm O the connecting-spring H is lifted from the support $c$, which causes the pawl I to fall and engage the ratchet K, which is attached to the side of the wheel L, these (the ratchet and wheel) being connected with the axle $m$ on the driving-wheel connected with it. The motion, then, of the machine carries the lever forward, lifting the plows out of the ground and up till the cut-off A drops into the notch $b$, when the end of this pawl I will slide upon the lug $r$, and, as before, both pawls will be lifted and held up by their springs catching on the support $c$, and the plows may be drawn along out of the ground, locked by the cut-off A.

The connections I have made between the lever and the pawls by means of the springs may be made by some other devices, and the same results be secured. Thus, by the operation of these cut-offs A and B and a suitable connecting mechanism uniting the lever and pawls, the plows, by the action of the driving-wheels, are lifted out of the ground and drawn along above it, or placed in the ground, doing their work.

What I claim as my invention, and desire to secure by Letters Patent, is—

1. The lever C, having the cut-offs A and B, in combination with the connecting-rod G, crank $f$, pawls I Q, and notched segment D, whereby the lever is locked to the driving-wheel and the plows raised or lowered by the forward movement of the machine, substantially as shown and described.

2. The combination of the lever C, having the cut-offs A and B and spurs $c$, with the springs H P and pawls I Q, substantially as specified.

3. The combination of the ratchet K and gear-wheel L, rigid upon the driving-wheel or axle, with the ratchet R, gear-wheel S, lever C, cut-offs A B, pawls I Q, springs H P, lugs $n\ r$, and notched segment D, substantially as set forth.

FREDC. H. ISAACS.

Witnesses:
HORACE HARRIS,
WM. H. ISAACS.